Figure 1:
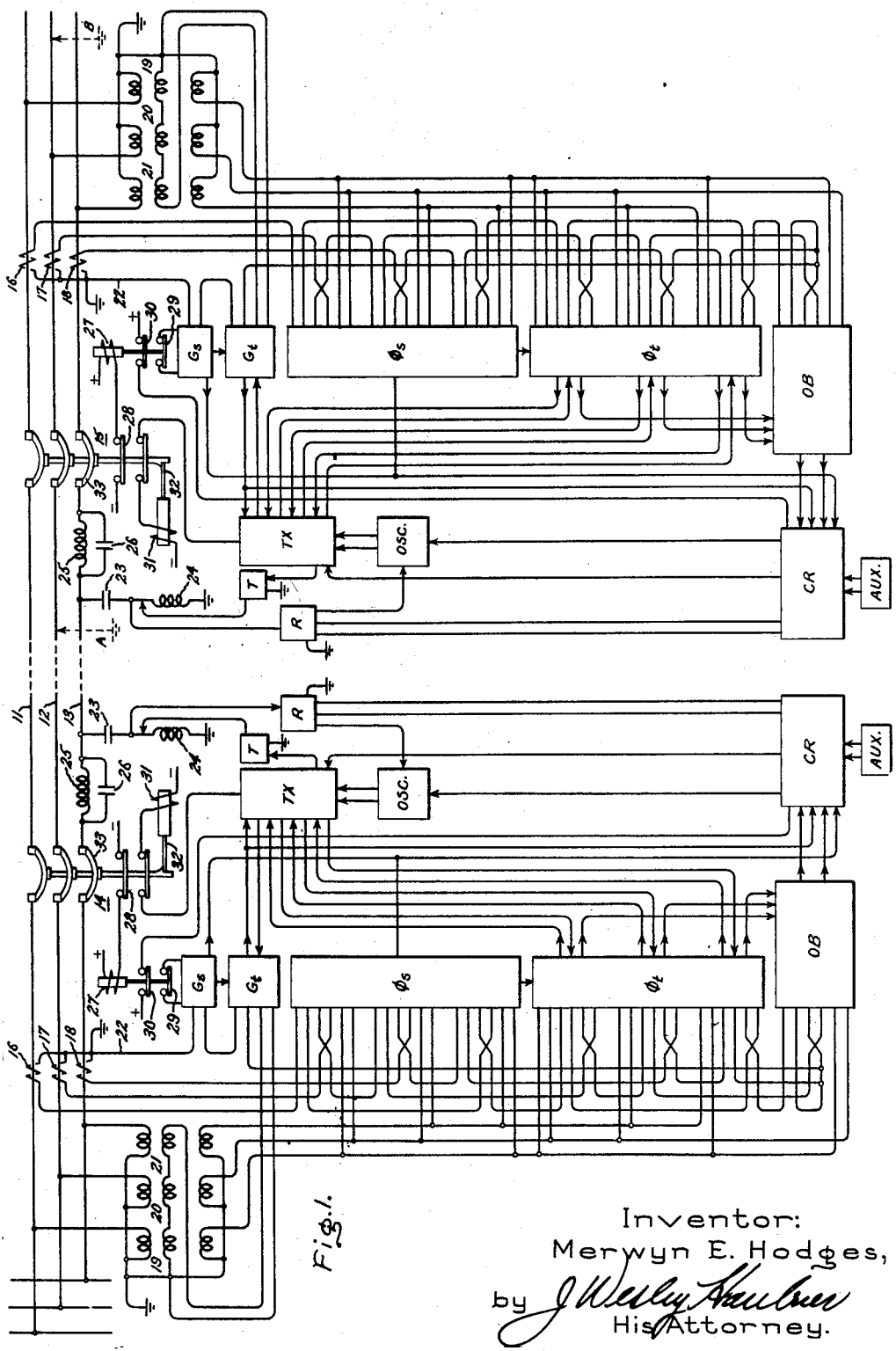

Feb. 10, 1959     M. E. HODGES     2,873,410
ELECTRONIC RELAY ARRANGEMENT FOR AN ELECTRIC
POWER TRANSMISSION LINE PROTECTIVE SYSTEM
Filed Nov. 29, 1954     3 Sheets-Sheet 1

Inventor:
Merwyn E. Hodges,
by His Attorney.

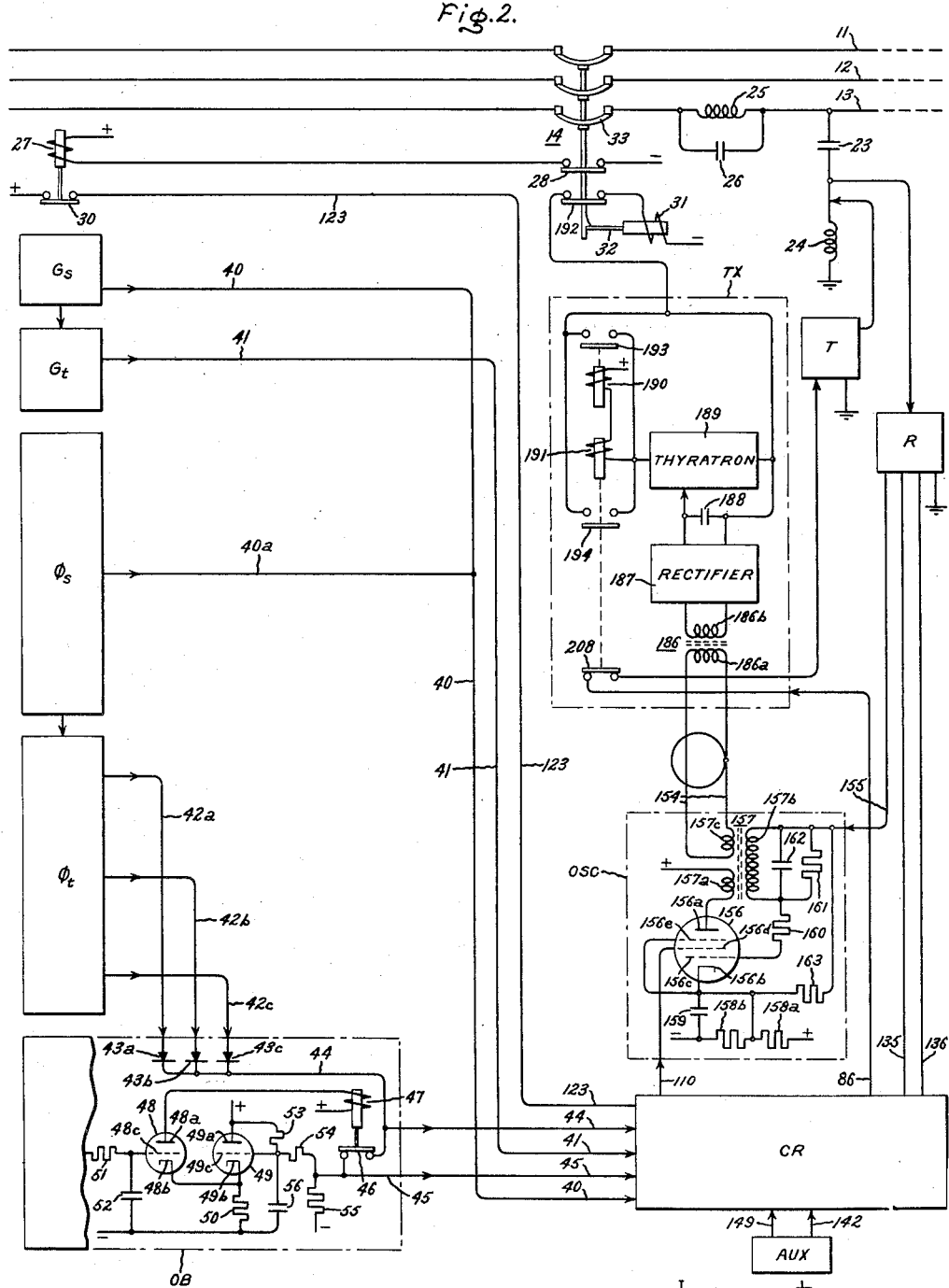

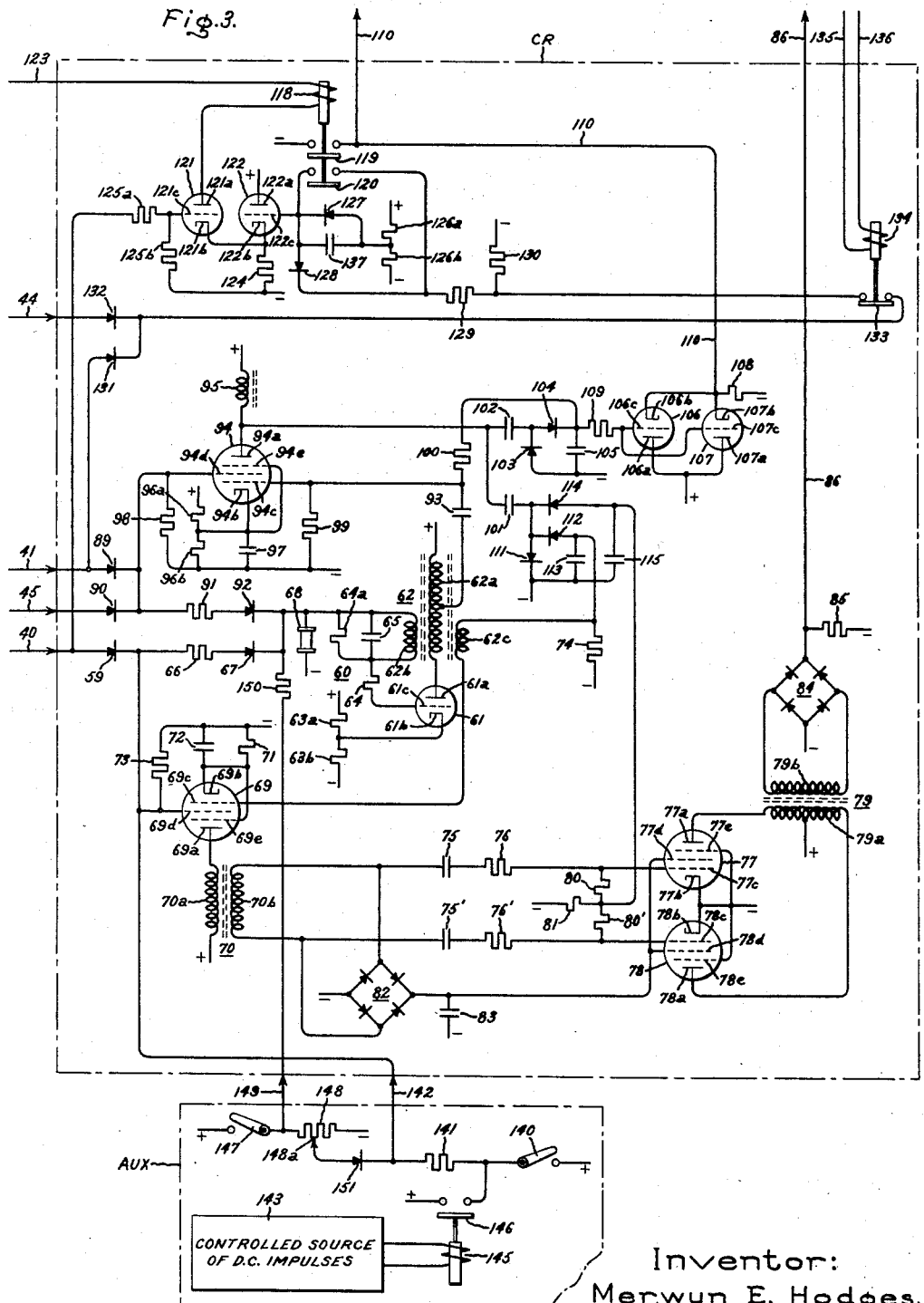

United States Patent Office 2,873,410
Patented Feb. 10, 1959

2,873,410

ELECTRONIC RELAY ARRANGEMENT FOR AN ELECTRIC POWER TRANSMISSION LINE PROTECTIVE SYSTEM

Merwyn E. Hodges, Philadelphia, Pa., assignor to General Electric Company, a corporation of New York Application November 29, 1954, Serial No. 471,593

18 Claims. (Cl. 317—28)

This invention relates to an electronic relay arrangement, and more particularly to an extremely high speed electronic relay arrangement for fault responsive directional-comparison pilot type electric power transmission line protective systems.

The trend today in the field of electric power, principally perhaps for reasons of economy, is to operate high-voltage transmission lines at loads which approach system stability limits. In order to maintain stability and to preserve continuity of service to the electric power consumers, it is increasingly desirable in present day electric power transmission applications to provide protective relaying systems capable of extremely high speed response. A protective relaying system which will respond to any fault condition on a transmission line within one cycle (based on the typical power system frequency of 60 cycles per second) would contribute greatly to the prevention of major system interruptions and to the mitigation of damage caused by a fault.

A high voltage transmission line typically conducts three phase alternating current between two multipole high-speed circuit breakers located at opposite ends or terminals of the transmission line. In some instances the line may be tapped and employ circuit breakers at all terminals. Whenever a fault condition occurs on the transmission line, it is highly desirable to open all circuit breakers quickly and substantially simultaneously thereby minimizing disturbance to the sound sections of the electric power system. This is especially true where the circuit breakers are called upon to reclose instantaneously following a temporary fault condition. To permit substantially simultaneous operation of the circuit breakers, it is necessary to provide a pilot channel for instantly conveying certain information from one terminal to all others. One well known method of obtaining this necessary intercommunication is by carrier-current wherein one of the conductors of the transmission line is used to carry a high-frequency continuous signal from one terminal to the others. The signal is utilized to prevent or block tripping of the circuit breakers located at the terminals. By providing suitable components, a protective relaying system can be made to operate as follows: If a fault occurs at a point remote from or external to the protected transmission line, carrier-current is transmitted from at least one of the terminals to block tripping of the circuit breakers at all terminals. If a fault occurs on the protected transmission line, carrier-current transmission is immediately stopped at all terminals and all circuit breakers are tripped thereby isolating the faulted transmission line.

The speed of operation of a transmission line protective relaying system using conventional electro-mechanical relays is affected by the magnitude of the fault current. Furthermore, the speed of operation of conventional electromechanical relays is inherently limited by the inertia of their moving parts. It is therefore a general object of this invention to provide for a high-voltage electric power transmission line a fault responsive protective relaying system employing electronic relays and capable of selective response within one cycle following the occurrence of a fault condition.

Another object of this invention is to provide a transmission line protective relaying system employing electronic relays and capable of supplying tripping impulses substantially simultaneously to the circuit breakers at all terminals of the line consistently within less than one cycle in response to a fault located at any point on the transmission line regardless of the magnitude of fault current.

It is a further object of this invention to provide for an electric power transmission line an accurate and reliable extremely high speed fault responsive protective relaying system utilizing electronic relay components.

Another object of this invention is to provide in a transmission line protective system an extremely high speed relay arrangement utilizing electronic elements for performing preselected dependent control functions in substantially instantaneous selective response to operations of fault detecting and directional responsive relays.

It is still another object of this invention to provide in a signal pilot type transmission line protective system an extremely high speed electronic control relay for selectively energizing and deenergizing a signal transmitter and for initiating tripping of a line circuit interrupter in substantially instantaneous selective response to indications supplied by fault detecting and directional responsive relays.

A further object of this invention is to provide an electronic relay arrangement for producing an alternating output voltage in substantially instantaneous selective response to two independent unidirectional input voltages.

Still another object is to provide an electronic control relay for selectively operating an electroresponsive device in delayed and dependent response to a plurality of independent input signals.

Another object of this invention is to provide for a transmission line protective relaying system having a conventional pilot channel, means for utilizing the pilot channel to convey certain information of an auxiliary nature without obstructing preferential use of the pilot channel by the relaying system.

In carrying out my invention in one form, I provide an electronic relay arrangement for a high-voltage transmission line fault responsive protective relaying system of the directional-comparison type. The transmission line is equipped with suitable carrier-current transmitting and receiving means at each terminal. The relaying system operates to initiate tripping of a circuit breaker located at each terminal of the protected transmission line within one cycle on a 60 cycles per second basis in response to the occurrence of a short circuit or fault condition on the protected line. The relaying system comprises at each terminal fault detecting electronic relays, directional responsive electronic relays, and suitable electronic control and auxiliary relays. Any fault in the electric power system within the protected transmission line and beyond it by a suitable margin will cause a fault detecting relay to respond at each terminal and produce rapidly a first control signal. The first control signal is supplied to an electronic control relay which immediately produces a starting signal of sufficient power content to energize the carrier-current transmitting means. When energized, the transmitting means instantly operates to generate continuous signal current. The receiving means located at each of the other terminals of the transmission line is energized by this signal current to disable an electronic auxiliary relay which is employed to initiate tripping of the associated circuit breaker. Thus, the immediate effect of the fault condition is to prevent or block tripping of the circuit breakers. A directional responsive relay responds whenever a fault is located in the direction of the protected transmission line with respect to the local terminal and produces rapidly a second control signal. The fault detecting and directional responsive relays are coordinated in a manner to insure that the second control signal is not produced until after the remote transmitting means has opportunity to operate. The second control signal is supplied to the control relay which substantially instantaneously produces a stopping signal and a tripping signal. The stopping signal deenergizes the local carrier-current transmitting means, thus discontinuing the signal current. The tripping signal has sufficient power content to energize the auxiliary relay in an attempt to trip the local circuit breaker. When energized by a tripping signal, the auxiliary relay will initiate tripping of the local circuit breaker as soon as the local carrier-current receiving means is deenergized. The local receiving means will be deenergized when signal current is discontinued at all of the remote terminals. In this manner, the circuit breaker at each terminal is tripped to remove the protected transmission line from service whenever a fault occurs on the protected transmission line.

The control relay includes means to suppress its tripping signal, thereby preventing energization of the auxiliary relay, after a first predetermined interval of time following receipt of the first control signal. This time interval is longer than the one cycle required for operation of the relaying system. The tripping signal can be resumed only after another predetermined time interval following both receipt by the control relay of the second control signal and deenergization of the local receiving means. In this manner tripping of a circuit breaker is blocked during certain adverse transient conditions in the power system external to the protected transmission line. I also provide means associated with the control relay for utilizing the carrier-current transmitting means to transmit certain information of an auxiliary nature, such as telemetering and telephony and the like. This means is arranged whereby it does not interfere with normal operations of the transmitting and receiving means during fault conditions.

My invention will be better understood and further objects and advantages will be apparent from the following description taken in conjunction with the accompanying drawings, in which Fig. 1 is a schematic diagram, partly in block form, of a high voltage transmission line having a fault responsive protective relaying system of the directional-comparison carrier-current pilot type which embodies a preferred form of my invention; Fig. 2 is a more detailed schematic circuit diagram of the protective relaying system shown at one terminal of the transmission line of Fig. 1; and Fig. 3 is a schematic circuit diagram illustrating the detailed circuitry of the control relay and auxiliary device, shown in block form in Fig. 2, which form part of my invention.

To illustrate a preferred embodiment of my invention, I have shown in Fig. 1 a high voltage transmission line protective relaying system of the directional-comparison carrier-current pilot relaying type. As can be seen in Fig. 1, a 3-phase transmission line, represented by conductors 11, 12 and 13, extends between two 3-pole circuit breakers 14 and 15. Circuit breakers 14 and 15 are located at what will be referred to hereinafter as the local and remote terminals, respectively, of the transmission line. The illustrated transmission line may be of the type employed in an electric power system to transmit 3-phase, alternating current of power frequency, such as 60 cycles per second, from one terminal to the other at very high voltage, e. g., 330,000 volts phase-to-phase. Identical protective relaying equipment is provided at each terminal to open quickly and simultaneously both circuit breakers 14 and 15, thereby isolating the transmission line, upon the occurrence of an internal fault, i. e., upon the occurrence of a short circuit between phase conductors (phase fault) or between a conductor and ground (ground fault) at some point along the line between the opposite terminals. The necessary intercommunication between the identical relaying equipments is accomplished in the illustrated embodiment of my invention by utilizing conductor 13 as a channel for transmission of high-frequency unmodulated carrier-current. Although I have illustrated only a two terminal transmission line, my invention is also adaptable to transmission lines having 3 or more terminals.

As shown in Fig. 1, at each terminal three instrument current transformers 16, 17, and 18 and three instrument potential transformers 19, 20, and 21 are coupled to conductors connecting each circuit breaker 14 and 15 to a 3-phase supply source or load bus of the power system. The secondary circuits of these instrument transformers are connected to certain relays at each terminal to supply current and voltage quantities which accurately reflect the current and voltage conditions existing at the transmission line. The relays which respond to these quantities may be divided into two general groups. A first group detects merely the existence of a fault condition, while a second group has directional characteristics and cooperates to determine the position of the fault in the power system. These relays, together with the relays and devices which perform associated functions, will first be described very generally. Then I will describe in detail the elements of my invention.

In the first group of relays mentioned above, an impedance relay $\varphi s$ located at each terminal, as shown in Fig. 1, responds immediately to a predetermined condition of line current and voltage which indicates that a phase fault has occurred. The fault thus detected may be located either internal or external to the protected transmission line. The impedance relay $\varphi s$ produces an output control signal which operates through a control relay CR to cause carrier-current to be transmitted over conductor 13, and carrier-current, as will be explained below, is employed to prevent opening of the circuit breakers. Impedance relay $\varphi s$ will be referred to as a "phase starting" relay because it responds to a phase fault to start the transmission of carrier current. Similarly, an overcurrent relay $Gs$ is provided at each terminal to respond quickly whenever current in the residual circuit 22 of the current transformer connections reaches a magnitude which indicates that a ground fault has occurred. Relay $Gs$ also produces an output control signal which operates through control relay CR to initiate the transmission of carrier-current, and this relay will be referred to as a "ground starting" relay. Thus, upon the occurrence of either a phase or a ground fault, carrier-current transmission is immediately started at each terminal.

A carrier current transmitter T is used at each terminal to transmit the high-frequency carrier-current. As can be seen in Fig. 1, a coupling capacitor 23 with sufficient insulation to withstand line voltage is connected in series circuit relationship with a drain coil 24 between conductor 13 and ground. Capacitor 23 easily passes high-frequency carrier-current, but presents a high impedance to the line current of power frequency. A parallel resonant circuit comprising an inductance 25 and capacitor 26 tuned to the carrier-current frequency is connected in series circuit relation with conductor 13 to provide a wave trap which confines the carrier-current to the protected transmission line extending between opposite terminals without introducing any appreciable impedance to current of power frequency in conductor 13. Transmitter T is connected to capacitor 23, and, when energized by control relay CR in response to operation of either the phase starting relay $\varphi s$ or the ground starting relay $Gs$, the transmitter will generate a continuous signal current at a high frequency, such as 100,000 cycles per second. This signal current will follow two parallel paths to ground: through the local drain coil 24, and by way of coupling capacitor 23 and conductor 13 through the drain coil 24 located at the opposite terminal; and a substantial carrier-current signal voltage is developed across drain coil 24. A carrier-current receiver R is connected in parallel circuit relationship with drain coil 24 at each terminal and is tuned to the frequency of the carrier-current transmission at the opposite terminal. Receiver R controls an auxiliary relay OSC, as will be described in detail below, in a manner to prevent or block tripping of the associated circuit breaker, 14 or 15, whenever the receiver is energized by the carrier-current signal voltage.

To determine the position of a fault, a mho type distance relay $\varphi t$ and a ground current directional relay $Gt$ are provided at each terminal. These relays operate immediately in response to the occurrence of phase and ground faults, respectively, located in the direction of the protected transmission line as viewed from the respective terminal. Relay $\varphi t$ or $Gt$ when operated produces an output control signal which, by means of control relay CR, performs two functions; it immediately stops the transmission of carrier-current by the associated transmitter T, and it attempts to open or trip the associated circuit breaker. The mho type distance relay $\varphi t$ is designated a "phase tripping" relay, and the ground current directional relay $Gt$ is designated a "ground tripping" relay.

The basic operation of the overall relaying system should now be understandable. As already stated, it is desirable to open simultaneously both circuit breakers 14 and 15 upon the occurrence of an internal fault. As a corollary, it is desired to prevent tripping of either circuit breaker whenever a fault condition develops external to the protected transmission line. Assume first an internal ground fault at A in Fig. 1. The ground starting relay $Gs$ at both terminals will detect the fault and immediately start carrier-current. Because the ground fault current flows toward the protected transmission line at both terminals, both ground tripping relays $Gt$ will operate to stop carrier-current and attempt tripping. Consequently, carrier-current transmission is stopped at both terminals, tripping is no longer blocked, and both circuit breakers 14 and 15 will open. Assume now an external ground fault at B in Fig. 1. The ground starting relay $Gs$ at both terminals will detect the fault and immediately operate to start carrier-current. Ground fault current at the terminal of circuit breaker 14 flows toward the protected transmission line, and the associated ground tripping relay $Gt$ will operate to stop carrier-current transmission from this terminal and attempt to trip circuit breaker 14. However, at the terminal of circuit breaker 15, ground fault current flows away from the protected transmission line, and ground tripping relay $Gt$ at this terminal will not operate. As a result, carrier-current continues to be transmitted from this terminal and to be received at the other terminal, thereby blocking the attempt to trip circuit breaker 14. No attempt to trip circuit breaker 15 is made. The operation of the relay system will be the same as described above for phase faults with the exception that phase relays $\varphi s$ and $\varphi t$ are affected instead of ground relays $Gs$ and $Gt$.

To insure correct operation of the relaying system during external faults such as ground fault at B in Fig. 1, it is essential that carrier-current is started at the terminal "seeing" an external fault (terminal 15), thereby to block tripping, before the tripping relay operates at the terminal "seeing" an internal fault (terminal 14). To provide for this sequence of operation, starting relay $Gs$ coordinates with the associated tripping relay $Gt$ in a manner whereby the tripping relay output control signal at terminal 14 is delayed until it is assured that the starting relay at terminal 15 has had an opportunity to complete its carrier-current starting function. This coordination is also provided between relays $Gs$ and $Gt$ at terminal 15, and similar coordination is provided between relays $\varphi s$ and $\varphi t$.

During a circuit breaker closing operation, all poles of the breaker may not make contact at the identical instant of time. Whenever this uneven or sequential pole closure occurs, momentary unbalanced currents can flow which may appear to the ground relays $Gs$ and $Gt$ cannot be produced, and in this manner false output tromagnetic relay 27 controlled by an auxiliary switch 28 of the circuit breaker is provided at each terminal as shown in Fig. 1. Relay 27 is energized and its contacts 29 and 30 close only after all three poles of the circuit breaker are closed. Until contact 29 is closed the necessary coordinating signal between relays $Gs$ and $Gt$ cannot be produced, and in this manner false output from ground tripping relay $Gt$ is prevented during sequential pole closure. Contact 30 is employed to perform a circuit controlling function in connection with control relay CR, as will be fully explained hereinafter.

Under certain conditions of power swings in the electric power system, which are power surges such as caused by the removal of a short circuit condition external to the protected line, or by the loss of synchronism between a generator and the system, the phase relays $\phi s$ and $\phi t$ may operate thereby giving a false indication of an internal fault. Therefore, an out-of-step blocking relay OB is provided to prevent or block the output control signal of the phase tripping relay $\phi t$ whenever a power swing is in progress.

As shown in Fig. 1, control relay CR, auxiliary relay OSC, and a tripping auxiliary unit TX are provided at each terminal to convert tripping relay signals into a signal suitable for energizing a trip coil 31 of the associated circuit breaker. Energization of trip coil 31 actuates a latch 32 thereby releasing switch member 33 of the circuit breaker for rapid circuit interrupting movement. Another function of the tripping auxiliary unit TX is to permit target operation in the tripping relay which operates to trip the circuit breaker. Unit TX also prevents energization of the associated transmitter T while the circuit breaker is opening.

Provision is included in the illustrated embodiment of the electric power transmission line protective system to permit the use of the carrier-current channel for telemetering and telephony and the like. Such auxiliary functions are represented by device AUX in Fig. 1. The control relay CR is designed to insure that the phase and ground relays always have preference in the use of the carrier-current channel, as will be clearly shown below.

The control relay CR includes a transient blocking function which prevents tripping of the associated circuit breaker when an external fault on a parallel transmission line is cleared sequentially, i. e., when the circuit breakers located at opposite terminals of a parallel transmission line do not open at the identical instant of time. Under this condition, it is possible for the fault current flowing in the protected transmission line to reverse direction. False tripping may result if a tripping relay operates at the terminal where fault current reverses from external to internal before carrier-current is started (thereby blocking tripping) at the opposite terminal where fault current reverses from internal to external. The transient blocking function of control relay CR prevents this undesirable false tripping and also enables the phase and ground relays to operate correctly under other short-term system disturbances external to the protected transmission line, as will appear clearly hereinafter.

To understand more fully the operation of my invention, reference should now be made to Figs. 2 and 3 and to the following description. Fig. 2 shows, partly in block form, a schematic circuit diagram of the various components of the transmission line protective system which are located at the terminal of circuit breaker 14. Ground starting and tripping relays $Gs$ and $Gt$ have been shown in simplified block form, and the connections between these relays and the instrument transformers have been omitted for the sake of drawing simplicity. Relay $Gs$ may be of any suitable type capable of rapid operation in response to the occurrence of a ground fault on the protected transmission line or nearby to produce an output control signal of positive unidirectional voltage. Relay Gt may be of any suitable type capable of rapid operation in response to ground current flowing toward the protected transmission line to produce an output control signal of positive unidirectional voltage. Relay Gt may coordinate with relay Gs to delay production of an effective output control signal by relay Gt until a predetermined period of time after relay Gs has operated. Examples of ground starting and tripping relays Gs and Gt which are particularly well suited for the illustrated embodiment of my invention are fully described and claimed in a copending application S. N. 469,947, filed on November 19, 1954, by Merwyn E. Hodges and Norman A. Koss and assigned to the present assignee. The Gs and Gt relays referred to have operating times within the range of .001 to .007 and .007 to .013 second respectively when employed on a 60 cycles per second electric power system. The output control signal of ground starting relay Gs is conveyed by a conductor 40 to control relay CR, and, in a manner to be described below, this signal starts the transmission of carrier-current from the associated transmitter T. The output control signal of ground tripping relay Gt is supplied to control relay CR by a conductor 41, and, in a manner to be described below, this signal stops the transmission of carrier-current and attempts to trip circuit breaker 14.

Phase starting and tripping relays $\phi s$ and $\phi t$ have also been shown in block form in Fig. 2, and again the connections between these relays and the instrument transformers have been omitted for the sake of drawing simplicity. It should be understood that any suitable relay capable of detecting any phase fault occurring on the protected transmission line or nearby, and rapidly operating to produce an output control signal of positive unidirectional voltage in response thereto, may be used for relay $\phi s$. Similarly, any suitable relay with directional characteristics, which is responsive only to a phase fault located in the direction of the protected transmission line to produce rapidly an output control signal of positive unidirectional voltage, may be used for relay $\phi t$. Relay $\phi t$ may coordinate with relay $\phi s$ to delay production of an effective output control signal by relay $\phi t$ until a predetermined period of time after relay $\phi s$ has operated. Examples of phase starting and tripping relays $\phi s$ and $\phi t$ which are particularly well suited for the purposes of the illustrated embodiment of my invention are fully described and claimed in a copending application S. N. 473,802, filed on December 8, 1954, by Merwyn E. Hodges, Norman A. Koss and Harold T. Seeley and assigned to the present assignee. The $\phi s$ and $\phi t$ relays referred to have operating times within the range of .002 to .011 and .005 to .014 second respectively in a 60 cycles per second electric power system. The output control signal of phase starting relay $\phi s$ is conveyed over a conductor 40a to conductor 40 and thence to control relay CR, and, in a manner to be described below, this signal starts the transmission of carrier current from the associated transmitter T. The output control signal of phase tripping relay $\phi t$ is supplied to out-of-step blocking relay OB by one of three conductors 42a, 42b, and 42c, depending upon which pair of conductors 11, 12 and 13 of the protected transmission line are involved in the phase fault. From relay OB this signal is transmitted to control relay CR where it stops the transmission of carrier current and attempts to trip circuit breaker 14, as will be described below.

Out-of-step blocking relay OB has been shown in Fig. 2 partly in block form, and for the sake of drawing simplicity the connections between this relay and the instrument transformers have not been shown. The function of relay OB is to block or prevent the output control signal of phase tripping relay $\phi t$ from reaching control relay CR whenever a power swing in the electric power system is in progress. A unique characteristic of a power swing is that the apparent impedance of the transmission line changes relatively slowly. In other words, the relationship of line voltage and current at terminal 14 during a power swing changes at a slow rate while approaching that critical relationship between these quantities at which relay $\phi t$ will operate, whereas under a true fault condition the rate of change is substantially instantaneous. To accomplish the aforesaid function, therefore, relay OB is adjusted to be more sensitive than relay $\phi t$ and to operate in advance thereof. A time delay arrangement is included to delay the blocking action of relay OB until after relay $\phi t$ has opportunity to perform its tripping function in case of a true internal fault. But if a power swing has caused relay OB to operate, by the time relay $\phi t$ responds thereto the time delay circuit has operated to block the output control signal. Although any suitable relay may be used to perform the out-of-step blocking function, I have shown partly in block form an embodiment particularly well suited for the purposes of the illustrated protective relaying system. This embodiment has been fully described and claimed in Patent 2,845,581, issued July 29, 1958, to Merwyn E. Hodges and Harold T. Seeley.

In the illustrated relay OB, as shown in Fig. 2, each conductor, 42a, 42b and 42c, is connected through a one-way electric valve or rectifier, 43a, 43b and 43c respectively, to a common conductor 44. The rectifiers 43a 43c are arranged to isolate each conductor, 42a 42c, along with its preceding circuit in relay $\phi t$. The output control signal of relay $\phi t$ is conveyed over conductor 44 directly to the transient blocking circuits of control relay CR. However, the tripping and carrier-current stopping circuits of relay CR are supplied by a conductor 45 which is coupled to conductor 44 through a normally closed permissive contact 46 of an electromagnetic relay 47. Thus, the output control signal can be blocked by energizing relay 47 to open permissive contact 46. A pair of triode vacuum tubes, 48 and 49, are provided to control the energization of electromagnetic relay 47. Tube 48 operates to energize relay 47 while tube 49 operates to suppress or disable tube 48 thereby preventing energization of relay 47. The plate or anode 48a of tube 48 is connected through the operating coil of relay 47 to a positive bus represented by the symbol (+). (The symbols (+) and (—) are used throughout the drawings to represent the positive and negative buses, respectively, of a unidirectional supply voltage source, such as a battery, which has not been shown for the sake of drawing simplicity.) The cathode 48b of tube 48 is connected through a cathode resistor 50 to negative bus. The cathode heater and heater circuit, being well known to those skilled in the art, have been omitted for the sake of drawing simplicity. A unidirectional voltage signal produced by the portion of out-of-step blocking relay OB shown in block form supplies the control grid 48c of tube 48 through an RC time delay circuit comprising resistor 51 and capacitor 52.

The portion of relay OB shown in block form in Fig. 2 represents a relay arrangement capable of producing a unidirectional voltage signal of predetermined magnitude and positive polarity with respect to negative bus substantially instantaneously in response to particular conditions of transmission line voltage and current such as may occur at some time during a power swing. A relay arrangement such as this is fully disclosed in the aforementioned Patent 2,845,581—Hodges and Seeley.

The plate 49a of tube 49 is connected directly to positive bus while the cathode 49b is connected through the common cathode resistor 50 to negative bus. The control grid 49c of tube 49 normally is supplied by a positive voltage derived from a voltage dividing network connected between positive and negative buses comprising a resistor 53 in series circuit with a resistor 54 in series circuit with a resistor 55 which is normally in parallel with the impedances to negative bus of the circuits coupled to conductors 44 and 45. Grid 49c is connected to the common point of resistors 53 and 54, and the terminal of permissive contact 46 coupled to conductor 45 is connected to the common point between resistors 54 and 55. The positive voltage on grid 49c renders tube 49 slightly conductive. As a result, under normal system conditions, sufficient current flows through cathode resistor 50 to raise the potential of cathode 48b to a value whereby tube 48 is biased to cutoff.

As soon as relay OB operates to produce a unidirectional voltage signal, the grid voltage of tube 48 increases with time delay to the predetermined magnitude of the signal, and tube 48 soon conducts sufficient current to energize electromagnetic relay 47 thereby opening permissive contact 46. The period of delay in energizing relay 47 is necessary when a true internal phase fault has occurred in order to give the output control signal of phase tripping relay $\phi t$ an opportunity to pass to control relay CR via conductor 45 before permissive contact 46 opens. The moment permissive contact 46 opens, grid voltage of tube 49 will tend to increase due to the elimination of a portion of the resistance in parallel with resistor 55 of the voltage dividing network. This event is undesirable if it occurs before tube 48 reaches full conduction, since the resulting increased conduction of tube 49 could cause conduction by tube 48 to decrease to a point where relay 47 will be deenergized. Therefore, a capacitor 56 is connected between grid 49c and negative bus to prevent adverse disturbance of the voltage level of grid 49c during the time required by tube 48 to reach full conduction after contact 46 opens. After electromagnetic relay 47 has been energized, a subsequent output control signal from relay $\phi t$ caused by the power swing will be blocked by the open circuit at permissive contact 46. In the case of a true fault, the output control signal of relay $\phi t$, which is of positive polarity and greater magnitude than the voltage signal produced by relay OB, is supplied to grid 49c through permissive contact 46 before electromagnetic relay 47 is energized. Tube 49 is immediately driven to full conduction, and the resulting rise in voltage level across cathode resistor 50 will bias tube 48 whereby conduction is suppressed even with full grid voltage. In this manner, during an internal phase fault energization of relay 47 is prevented and the output control signal of relay $\phi t$ is transmitted by conductor 45 to the tripping and carrier-current stopping circuits of control relay CR. Resistor 54 is required to prevent undesirable loading of the output control signal by the grid circuit of tube 49, but the value of its resistance is sufficiently low to form with capacitor 56 only a relatively short time constant thereby preventing adverse delay in the suppressing action of tube 49 in response to an output control signal.

Reference should now be made to Fig. 3 which shows in detail the preferred circuitry of the illustrated embodiment of my new and improved control relay CR. Control relay CR operates substantially instantaneously to convert the output control signal of either the ground or the phase starting relay, Gs or $\phi s$, into a suitable signal for energizing the carrier-current transmitter T, and to convert the output control signal of either the ground or the phase tripping relay, Gt or $\phi t$, into a suitable signal for initiating tripping of circuit breaker 14. Within relay CR, the control signal from the tripping relay effectively deenergizes transmitter T and stops carrier-current by blocking the control signal of the starting relays. Also within relay CR a transient blocking circuit is provided to prevent tripping of circuit breaker 14 during short-term external system disturbances. In performing these control functions, relay CR simulates the action of a group of high-speed electromechanical switches.

As can be seen in Fig. 3, conductor 40, which conveys the output control signal from ground and phase starting relays Gs and $\phi s$ to relay CR, is connected through a rectifier 59 to an input circuit of an oscillator 60. The oscillator is provided to convert the output control signal to a basic alternating voltage which may be readily amplified to a sufficient power level to perform subsequent control functions. Oscillator 60 comprises a triode vacuum tube 61 having a plate or anode 61a connected to positive bus through a primary winding 62a of a powdered iron core coupling transformer 62. The cathode 61b of tube 61 is supplied with a positive fixed bias voltage by a pair of voltage dividing resistors 63a and 63b connected between positive and negative bus. This cathode bias renders tube 61 normally non-conducting. The control grid 61c of tube 61 is connected through a resistor 64, which limits grid current, to a parallel RLC positive feed back circuit comprising a resistor 64a, a capacitor 65 and a feed back winding 62b of coupling transformer 62. A unidirectional control voltage of positive polarity with respect to negative bus and of predetermined magnitude when applied to this feed back circuit will operably energize tube 61 by overcoming the positive cathode bias and will cause tube 61 to become conductive immediately. Plate current flowing through coupling transformer primary winding 62a induces voltage in feed back winding 62b, and this voltage in a conventional manner causes oscillation in the circuit of tube 61. The components of the feed back circuit are selected to cause oscillations at a high frequency, such as 12,000 cycles per second. The output control signal of either starting relay Gs or $\phi s$, which is supplied to an input circuit of oscillator 60, is adequate to initiate and sustain the oscillations. The input circuit comprises a resistor 66 connected in series circuit relationship with a rectifier 67 which is coupled to the feed back circuit of the oscillator 60. Resistor 66 cooperates with a voltage limiter 68 connected between the feed back circuit and negative bus to prevent the voltage level of grid 61c from exceeding a predetermined maximum value as a result of large amplitudes of control signals. The limiter 68 has a non-linear current-voltage characteristic, that is, the ohmic value of a limiter decreases with increasing voltage applied across it so that current will increase at a greater rate than voltage. Many such non-linear current-voltage characteristic devices are known in the art, and for the purposes of the illustrated embodiment of my invention I prefer at present to use a special ceramic resistance material comprising silicon carbide crystals held together by a suitable binder, such as described and claimed in United States Letters Patent No. 1,822,742, issued to Karl B. McEachron on September 8, 1931. Rectifier 67 is arranged to isolate this input circuit from other input circuits which are provided for the oscillator and which will be described below.

An output winding 62c of the coupling transformer 62 of oscillator 60 is connected to a control grid 69c of an intermediate amplifier operating class A and comprising pentode vacuum tube 69. Amplifier tube 69 is provided to amplify the alternating voltage induced in output winding 62c upon operation of oscillator 60. The plate 69a of amplifier tube 69 is connected to positive bus through a primary winding 70a of a powdered iron core transformer 70. The cathode 69b of amplifier tube 69 is connected to negative bus through a cathode self-bias circuit comprising a resistor 71 in parallel with a capacitor 72 which establishes the proper average positive voltage level at cathode 69b for optimum amplification. The amplifier screen grid 69d is supplied by the same starting relay output control signal which energizes oscillator 60. A resistor 73 connected between screen grid 69d and negative bus establishes a reference to prevent floating of the screen grid voltage when no output control signal is present. A resistor 74 is connected from output winding 62c to negative bus to establish a grid current return path from control grid 69c to cathode 69b of amplifier tube 69. A suppressor grid 69e is connected directly to cathode 69b. With this arrangement, intermediate amplifier tube 69 will produce an amplified alternating voltage in the secondary winding 70b of transformer 70 in response to operation of oscillator 60 and under the selective supervision of the positive output control signal of either ground or phase starting relay Gs or φs. In the absence of a control signal on screen grid 69d, tube 69 is nonconductive and cathode 69b is at negative bus potential. Since cathode 69b is at negative bus potential the instant at which tube 69 is rendered conductive, a desirable high initial amplification is obtained which contributes to the fast response of subsequent circuits.

The secondary winding 70b of transformer 70 is coupled to a push-pull amplifier by a pair of capacitors 75 and 75' connected in series circuit relationship with resistors 76 and 76' respectively. The push-pull amplifier comprises a pair of pentode vacuum tubes 77 and 78 each operating as a class $AB_2$ amplifier, and this amplifier is employed to increase the power content of the input alternating voltage signals supplied by intermediate amplifier tube 69. Plates 77a and 78a of the push-pull tubes 77 and 78 are connected to opposite terminals of primary winding 79a of a powdered iron core coupling transformer 79 which has a center tap connected to positive bus. The cathodes 77b and 78b of the tubes are connected directly to negative bus in order to obtain maximum amplification. The control grid 77c and 78c of each tube is connected to resistor 76 and 76' respectively. A pair of grid leak resistors 80 and 80' interconnect control grids 77c and 78c, and another resistor 81 is connected from the common point of the resistors 80 and 80' to negative bus thereby to provide a path for direct current flow between the control grids 77c and 78c and their respective cathodes 77b and 78b. A capacitor 115 in parallel with resistor 81 provides a shunt path of negligible impedance to alternating current. The series circuit combinations of resistors 76 and 80 and of resistors 76' and 80' divide the input alternating voltage of transformer secondary winding 70b so that the amplitude of voltage applied to control grids 77c and 78c is of correct magnitude for optimum amplification. Current drawn by a control grid during a positive half cycle of the input voltage causes a charge to accumulate on the associated capacitor 75 or 75' which leaks off through resistor 80 or 80' and resistor 81 during each negative half cycle. As a result, a grid leak bias voltage which is negative with respect to cathode is developed on control grids 77c and 78c, and the value of this bias voltage adjusts itself to provide a correct continuous operating point for the push-pull tubes. With this arrangement a desirable high initial amplification is obtained which contributes to the fast response of subsequent circuits. Screen grids 77d and 78d of push-pull tubes 77 and 78 are supplied with a positive unidirectional voltage derived from the input alternating voltage of transformer secondary winding 70b. A full wave bridge type rectifier 82 is connected across secondary winding 70b, and a filter capacitor 83 is connected from the positive terminal of this rectifier to negative bus to smooth the rectified unidirectional voltage which is applied to screen grids 77d and 78d. The magnitude of screen grid voltage controls the amount of amplification of push-pull amplifier, and as long as the intermediate amplifier tube 69 produces no output, the push-pull amplifier tubes 77 and 78 cannot conduct. The suppressor grids 77e and 78e of the tubes are each connected directly to their respective cathodes 77b and 78b.

The alternating voltage induced in output winding 79b of coupling transformer 79 is rectified by a full wave bridge type rectifier 84, and a final unidirectional starting signal appears across a resistor 85 in response to the output control signal of either ground or phase starting relay Gs or φs. The positive terminal of resistor 85 is connected to transmitter T via tripping auxiliary unit TX, shown in Fig. 2, by a conductor 86. The illustrated embodiment of control relay CR has been found by tests to respond within .0002 second following the arrival of an output control signal from relay Gs or φs to produce a starting signal of sufficient magnitude and power content to energize the carrier-current transmitter T.

As shown in Fig. 3, conductor 41, which conveys the output control signal from ground tripping relay Gt, and conductor 45, which conveys the output control signal from phase tripping relay φt via permissive contact 46 of out-of-step blocking relay OB, are interconnected within the control relay CR. Separate rectifiers, 89 and 90 respectively, are used to isolate these two conductors as well as their preceding circuits from each other. The output control signal of either tripping relay Gt or φt is supplied to an input circuit of oscillator 60 from the junction of the isolating rectifiers 89 and 90. This input circuit comprises a resistor 91 in series circuit relationship with a rectifier 92 which is coupled to the feed back circuit of oscillator 60. Resistor 91 cooperates with the voltage limiter 68 to prevent the voltage level of oscillator tube grid 61c from exceeding a predetermined maximum value. Rectifier 92 is arranged to isolate this input circuit from other input circuits which are coupled to the oscillator. The output control signal of either tripping relay Gt or φt is of proper polarity and magnitude to initiate and sustain oscillations of the oscillator 60.

A capacitor 93, as can be seen in Fig. 3, couples a tapped portion of transformer primary winding 62a of oscillator 60 to a control grid 94c of an amplifier operating class A and comprising a pentode vacuum tube 94. Amplifier tube 94 is provided to amplify the alternating voltage developed across the tapped portion of transformer primary winding 62a upon operation of oscillator 60. The plate 94a of amplifier tube 94 is connected to positive bus through a powdered iron core inductor 95. The cathode 94b of tube 94 is supplied with a positive fixed bias voltage by a pair of voltage dividing resistors 96a and 96b connected between positive and negative bus. A capacitor 97 connected across resistor 96b provides a shunt path of negligible impedance to alternating current. This fixed cathode bias renders tube 94 non-conductive until positive unidirectional voltage of predetermined magnitude is applied to its screen grid 94d. The amplifier screen grid 94d is supplied by the same tripping relay output control signal which energizes oscillator 60. An output control signal produced by a tripping relay in coordination with its associated starting relay will attain, at some point in its rise from an initial zero level, an effective value which corresponds to the predetermined magnitude of voltage required to initiate conduction in amplifier tube 94. A resistor 98 connected between screen grid 94d and negative bus establishes a reference to prevent floating of the screen grid voltage when no output control signal is present. A resistor 99 is connected from control grid 94c to negative bus to establish a grid current return path from the control grid to cathode 94b. A suppressor grid 94e is connected directly to cathode 94b. In order to permit amplifier tube 94 to attain full conduction substantially instantaneously in response to the predetermined magnitude of screen grid voltage, a positive feed back circuit is provided. The amplified output voltage of the amplifier is rectified and filtered, as will be described below, and applied to a voltage dividing network comprising a resistor 100 connected in series circuit relationship with resistor 99. The control grid 94c responds to this feedback voltage in a manner to raise the operating point of the amplifier tube 94 thereby increasing amplification, particularly during the portion of the screen voltage rise from effective value to maximum level. The amplifier tube 94 will produce an amplified alternating voltage output across inductor 95 immediately in response to operation of oscillator 60 and under the selective supervision of an effective output control signal from either ground or phase tripping relays Gt or φt. It should be apparent that although oscillator 60 may be operably energized by any one of several input signals, amplifier tube 94 will operate only in response to an effective output control signal produced by a tripping relay.

Two separate circuits respond to the amplified voltage output of amplifier tube 94. One circuit coupled to plate 94a of tube 94 by a capacitor 101 produces two negative polarity continuous unidirectional stopping voltages of relatively large magnitudes which operate to cut off the intermediate amplifier tube 69 and the push-pull amplifier tubes 77 and 78, as will soon be described in detail. The other circuit is coupled to plate 94a by a capacitor 102 and produces a continuous positive unidirectional voltage tripping signal of sufficient power content to initiate tripping of circuit breaker 14. This latter circuit comprises a voltage doubler arrangement which includes coupling capacitor 102, a shunt rectifier 103 connected between capacitor 102 and negative bus, and a blocking rectifier 104 connected in series circuit relationship with a filter capacitor 105 across shunt rectifier 103. A voltage substantially equal to the peak-to-peak value of the amplified alternating voltage is developed by this circuit across a load resistance comprising resistors 100 and 99 which are connected from the common point between blocking rectifier 104 and filter capacitor 105 to negative bus. During a negative half cycle of the alternating voltage, shunt rectifier 103 conducts current which charges capacitor 102 by an amount substantially equal to the peak value of the half cycle of voltage. During the succeeding positive half cycle, blocking rectifier 104 conducts current and filter capacitor 105 is charged to a voltage level determined by the charge accumulated on capacitor 102 during the preceding negative half cycle plus the peak value of the positive half cycle of voltage. Thus, filter capacitor 105 is charged to a voltage level substantially equal to twice the peak value of amplified alternating voltage. This unidirectional voltage is applied to the load resistance, blocking rectifier 104 preventing the discharge of filter capacitor 105 back into coupling capacitor 102 during the next negative half cycle. The portion of this doubled unidirectional voltage that appears across resistor 99 comprises the positive feedback voltage for amplifier tube 94 mentioned above. The doubled voltage is also supplied to grids 106c and 107c of a double cathode follower arrangement comprising a pair of parallel connected triode vacuum tubes 106 and 107. The plates 106a and 107a of both tubes are connected directly to positive bus, while the cathodes 106b and 107b are connected through a common cathode resistor 108 to negative bus. A grid resistor 109 limits the magnitude of grid current to an acceptable value. By applying the doubled voltage to grids 106c and 107c, the tubes 106 and 107 are immediately driven to full conduction, and the resulting voltage drop across cathode resistor 108 provides a tripping signal from a very low impedance source. By means of a conductor 110 connected to the positive terminal of resistor 108, this tripping signal is supplied to auxiliary relay OSC shown in Fig. 2. The illustrated embodiment of control relay CR has been found by tests to respond within .0002 second following the arrival of the output control signal from relay Gt or ϕt to produce a tripping signal of sufficient magnitude and power content to energize relay OSC. Auxiliary relay OSC operates to initiate tripping of circuit breaker 14 in a manner to be described below.

To produce stopping voltages in response to the amplified voltage output of amplifier tube 94, I provide two voltage doubler arrangements which, as shown in Fig. 3, are similar to the voltage doubler described above. Each voltage doubler shares a common coupling capacitor 101 and a common shunt rectifier 111. A blocking rectifier 112 and filter capacitor 113 complete one voltage doubler, and a first stopping voltage is developed across a load resistance comprising resistor 74. The other voltage doubler includes a blocking rectifier 114 and a filter capacitor 115, and a second stopping voltage is developed across a load resistance comprising resistor 81. The shunt and blocking rectifiers are arranged to develop unidirectional stopping voltage of negative polarity with respect to negative bus and having a magnitude substantially equal to twice the peak value of the amplified alternating voltage output. The first stopping voltage drives the average value of control grid voltage of the intermediate amplifier tube 69 to a sufficiently negative value whereby tube 69 is cut off or disabled and no conduction can occur. Similarly, the second stopping voltage drives the average value of the control grid voltages of the push-pull amplifier tubes 77 and 78 to a sufficiently negative value whereby the push-pull amplifier is cut off and no conduction can occur. Resistors 76 and 76' isolate the second stopping voltage from capacitors 75 and 75' thereby permitting a rapid change of control grid voltage to cutoff value. This double cutoff action rapidly and positively blocks the output control signal received from a starting relay. As a result, the starting signal produced by control relay CR is stopped, thereby deenergizing transmitter T, within an exceptionally short time. The illustrated embodiment of control relay CR has been found by tests to require less than .0007 second to completely discontinue the starting signal after the arrival of an output control signal from a tripping relay Gt or ϕt.

The transient blocking circuit of control relay CR includes an electromagnetic relay 118 which has a pair of normally open switch contacts 119 and 120. As shown in Fig. 3, switch contact 119 couples conductor 110 to negative bus. Therefore, whenever electromagnetic relay 118 is energized, conductor 110 will be connected to negative bus and the positive tripping signal produced by control relay CR is effectively suppressed. It is desirable to suppress or block the tripping signal, thereby preventing tripping of circuit breaker 14, whenever an external fault on a parallel transmission line is cleared sequentially, as has been discussed hereinbefore. It is also desirable to block the tripping signal during an external fault, such as at B in Fig. 1, if the transmission of carrier current from remote terminal 15 is momentarily discontinued due to a short-term adverse system disturbance such as may occur during interruption of fault current by nearby circuit breakers. On the other hand, the tripping function at the local terminal must not be impaired during an internal fault. Preferred circuitry of the transient blocking circuit and the manner in which it fulfills these requirements will be developed below.

A pair of triode vacuum tubes 121 and 122 are provided to control the energization of electromagnetic relay 118. Tube 121 operates to energize relay 118 while tube 122 operates to suppress or disable tube 121 thereby deenergizing relay 118. The plate 121a of tube 121 is connected to positive bus through the operating coil of relay 118 and by means of a conductor 123 through contact 30 of the electromagnetic relay 27 shown in Fig. 2. As has been described hereinbefore, contact 30 will be open as long as any pole of circuit breaker 14 is open; therefore electromagnetic relay 118 cannot be energized during sequential pole closure of circuit breaker 14. The cathode 121b of tube 121 is connected through a cathode resistor 124 to negative bus. As can be seen in Fig. 3, a portion of the output control signal of starting relay Gs or ϕs supplies the control grid 121c of tube 121. A pair of series connected voltage dividing resistors 125a and 125b are connected between conductor 40 and negative bus. The voltage across resistor 125b, which is a portion of the positive unidirectional voltage appearing on conductor 40 in response to operation of a starting relay, is applied to control grid 121c, and tube 121 immediately responds by conducting current which energizes electromagnetic relay 118. Relay 118 is arranged to operate with a slight time delay when energized. For the purposes of the illustrated embodiment of my invention, I prefer to use an electromagnetic relay which requires approximately .025 second to close its contacts after energization. This time delay corresponds to one and one-half cycles on a 60 cycles per second basis. By using suitable phase and ground starting and tripping relays, the illustrated protective relaying system will respond to an internal fault in less than one cycle on a 60 cycles per second basis; therefore ample time is allowed for the system to perform correctly its tripping function before the tripping signal is blocked by operation of relay 118.

The plate 122a of tube 122 is connected directly to positive bus while the cathode 122b is connected through the common cathode resistor 124 to negative bus. The control grid 122c of tube 122 normally is supplied by a positive unidirectional voltage derived from a low impedance voltage dividing network comprising resistors 126a and 126b connected between positive and negative bus. Grid 122c is connected to the voltage dividing network through a rectifier 127. To prevent the grid voltage from floating positive with respect to cathode potential, a path for direct current flow from grid 122c to negative bus is provided comprising a rectifier 128, a resistor 129 and another resistor 130. The normal voltage on grid 122c renders tube 122 slightly conductive. As a result, sufficient current flows through cathode resistor 124 to raise the potential of cathode 121b to a value whereby tube 121 is biased to cutoff in the absence of an output control signal from a starting relay.

Energization of electromagnetic relay 118 in response to a starting relay output control signal cannot be prevented; but after relay 118 has operated, it may be deenergized in delayed response to an output control signal from either tripping relay Gt or φt. Conductor 41 which conveys the output control signal from ground tripping relay Gt, and conductor 44 which conveys the output control signal from phase tripping relay φt, are interconnected within control relay CR. Separate rectifiers, 131 and 132 respectively, are used to isolate these two conductors as well as their preceding circuits thereby preventing mutual influence. The output control signal of relay φt is not subject to blocking by out-of-step blocking relay OB. Both conductors 41 and 44 are coupled to the control grid 122c of tube 122 through a contact 133 of a supervising electromagnetic relay 134, through resistor 129, and through switch contact 120 of electromagnetic relay 118. The operating coil of the supervising relay 134 is connected by means of a pair of conductors 135 and 136 to receiver R, shown in Fig. 2. Receiver R will energize relay 134 as long as no carrier-current is being transmitted from terminal 15, but as soon as carrier current is transmitted, this relay is deenergized and contact 133 will open to block the output control signal. Switch contact 120 is permissive in nature and prevents the output control signal from reaching grid 122c until after electromagnetic relay 118 has operated. The rectifier 128, which is connected in parallel with permissive contact 120, as shown in Fig. 3, is arranged to block the positive unidirectional voltage output control signal. A capacitor 137 is connected from grid 122c to the common point between resistors 126a and 126b of the voltage dividing network. Resistor 129 and capacitor 137 form an RC time delay circuit which delays the build-up of voltage on grid 122c in response to the output control signal of a tripping relay.

To deenergize electromagnetic relay 118, permissive contact 120 must be closed, supervising relay 134 must be energized, and an output control signal must be produced by relay Gt or φt. From the moment that all of these conditions are met, positive unidirectional voltage begins to increase on control grid 122c. After a predetermined interval of time, sufficient grid voltage is present to drive tube 122 to full conduction, and the resulting rise in voltage level across cathode resistor 124 will bias tube 121 whereby conduction is suppressed and tube 121 is disabled. Tube 121 will be unable to conduct even with maximum available voltage on its control grid 121c, and electromagnetic relay 118 consequently is deenergized thereby reestablishing the tripping signal. For the purposes of the illustrated embodiment of my invention, the magnitude of resistance and capacitance of resistor 129 and capacitor 137 respectively are selected to delay opening of switch contacts 119 and 120 in response to an output control signal from a tripping relay for at least .050 second but less than .083 second. These limits of time delay, which correspond respectively to three and five cycles on a 60 cycles per second basis, include the time required to close contact 133 of supervising relay 134 following deenergization of receiver R. After permissive contact 120 has opened, full conduction by tube 122 will continue as long as the tripping relay output control signal remains. The voltage on control grid 122c is maintained by capacitor 137 which cannot discharge either through the rectifier 127 due to its high backward resistance, or through resistors 129, 130, and 126b due to the presence of the output control signal across resistor 130. As soon as the output control signal is removed, capacitor 137 discharges through rectifier 128 and resistors 129, 130, and 126b, and the transient blocking circuit resets whereby electromagnetic relay 118 can again be energized by a subsequent output control signal from a starting relay.

As stated above, during an internal fault, tripping of circuit breaker 14 will be initiated before electromagnetic relay 118 of the transient blocking circuit can operate to block or suppress the tripping signal. But assume that an external phase fault occurs on a parallel transmission line and that as a result fault current flows through the protected transmission line, shown in Fig. 1, in a direction from terminal 14 toward terminal 15. At terminal 14, both the phase starting and the phase tripping relays φs and φt will operate immediately in response to the fault current, while at terminal 15 only the phase starting relay φs operates. The resulting carrier-current transmitted from terminal 15 blocks tripping at terminal 14, while no tripping is attempted at terminal 15. At both terminals in approximately .025 second following the production of an output control signal by the phase starting relays φs, the electromagnetic relays 118 in the transient blocking circuits of control relays CR operate. At terminal 14 the tripping signal is suppressed when electromagnetic relay 118 operates, and the tripping signal will remain suppressed as long as carrier-current is being received by receiver R, since under this condition contact 133 of supervising electromagnetic relay 134 is open and the deenergizing circuit of electromagnetic relay 118 is rendered inactive. At terminal 15, no attempt is made to deenergize electromagnetic relay 118 since the phase tripping relay φt has not operated. If the transmission of carrier-current from transmitter T at terminal 15 is momentarily discontinued due to some short-term system disturbance, circuit breaker 14 cannot be tripped immediately because its tripping signal is suppressed by the transient blocking circuit. When carrier-current stops, supervising relay 134 operates to close contact 133, and the output control signal from the local phase tripping relay φt is applied to the control grid 122c of tube 122. Since a delay of .050 to .083 second following the cessation of carrier-current is required before electromagnetic relay 118 can open switch contact 119, tripping of circuit breaker 14 will be prevented as long as carrier-current transmission is resumed before this delay period has elapsed. If the fault on the parallel transmission line is cleared sequentially so that fault current reverses in the protected transmission line, it is possible that carrier-current transmission will be discontinued momentarily if the transmitter T located at terminal 15 is deenergized as a result of phase tripping relay operation at terminal 15 before the transmitter T located at terminal 14 is energized in response to removal of the phase tripping relay output control signal at terminal 14. Since this period of no carrier-current is invariably shorter than the time delay required to open contact 119 in the transient blocking circuit of control relay CR, no false tripping can occur at either terminal 14 or 15.

Device AUX has been shown in detail in Fig. 3. Each element of this device supplies to control relay CR a positive unidirectional voltage suitable for producing a starting signal which energizes transmitter T. In this manner the carrier-current channel interconnecting opposite terminals can be used for certain auxiliary functions. Within device AUX test switching means such as, for example, a single pole knife switch 140, is connected from positive bus to a current limiting resistor 141 which in turn is coupled to a conductor 142. From AUX, conductor 142 extends into control relay CR where it connects to the input circuit of oscillator 60 comprising resistor 66 and rectifier 67 and also to screen grid 69d of intermediate amplifier tube 69. Closure of test switch 140 applies a positive unidirectional voltage to conductor 142, and this voltage operably energizes oscillator 60 and also permits conduction by intermediate amplifier 69 thereby producing a starting signal across resistor 85 in a manner previously described. Rectifier 59 is arranged to isolate the transient blocking circuit of control relay CR from the positive voltage supplied by device AUX. By closing test switch 140, the carrier-current transmitter T and receiver R can be tested for correct operation.

A telemetering arrangement is represented in simplified form in Fig. 3 by a controlled source of direct current unidirectional impulses 143 and an electromagnetic relay 145. Positive bus is connected through a contact 146 of electromagnetic relay 145 to current limiting resistor 141 which is coupled to conductor 142. When relay 145 is energized in response to impulses of current from source 143, contact 146 makes and breaks contact for each impulse. The impulses may have a repetition rate for example of 15 pulses per second. In this manner, controlled pulsating voltage is supplied to control relay CR and a pulsating starting signal will be produced thereby. Therefore, a pulsating carrier-current signal will be transmitted by transmitter T, and by suitable coding and decoding means, not shown, this signal can be employed to convey selected information from one terminal to another.

The carrier-current channel can be used for telephony. Suitable switching means, such as the single pole knife switch 147 illustrated in Fig. 3, couples positive bus to one terminal of an adjustably tapped resistor 148 and also to a conductor 149. When switch 147 is closed, conductor 149 conveys positive unidirectional voltage to control relay CR. Conductor 149 is connected within relay CR to another input circuit for oscillator 60. This input circuit comprises resistor 150 which, in combination with voltage limiter 68, limits the voltage level at control grid 61c of oscillator tube 61. The positive voltage conveyed by conductor 149 operably energizes oscillator 60. Tapped resistor 148 is connected between switch 147 and negative bus, and a slider 148a is connected to this resistor. Slider 148a is coupled through a rectifier 151 to conductor 142, and the positive unidirectional voltage at slider 148 is supplied by conductor 142 to the screen grid 69d of intermediate amplifier tube 69 in control relay CR. Rectifier 151 prevents the tapped portion of resistor 148 from loading the output control signal of either starting relay Gs or φs. Slider 148a is adjusted to provide a relatively low value of voltage. This voltage applied to screen grid 69d causes the intermediate amplifier to produce alternating voltage of relatively low amplitude, and as a result the starting signal appearing on conductor 86 will be at a reduced voltage level. In this manner the transmitter T will be energized at a lower level than during fault conditions, and suitable amplitude modulating and demodulating means, not shown, can be readily employed to utilize carrier-current for telephone purposes. Since the transmission of carrier-current operates to block tripping, and since operation of a tripping relay Gt or φt will stop the starting signal thereby deenergizing transmitter T in the manner described above regardless of whether a fault detecting relay or an auxiliary function started carrier-current, the various elements of device AUX cannot interfere with the normal operation of the protective relaying system during fault conditions.

Consideration should now be given to auxiliary relay OSC shown in Fig. 2. This component of my invention operates to produce an alternating output voltage when energized by a tripping signal from control relay CR. The output voltage is supplied over a coaxial cable 154 to tripping auxiliary unit TX, and its presence at unit TX initiates tripping of circuit breaker 14 as will be described below. However, auxiliary relay OSC is also controlled by the carrier-current receiver R. Receiver R, when energized as a result of carrier-current transmitted from the remote transmitter T, produces a negative voltage blocking signal, and this blocking signal, which is conveyed to relay OSC by means of a conductor 155, renders relay OSC inoperable to produce output voltage.

Although other suitable circuits may be used for auxiliary relay OSC, for the purposes of the illustrated embodiment of my invention I prefer at present to use a novel circuit arrangement which has been found by tests to be operable to produce an output voltage, in the absence of a blocking signal from receiver R, within .0002 second following energization by a tripping signal. My auxiliary relay OSC, as shown in Fig. 2, comprises an oscillator pentode vacuum tube 156. The plate 156a of tube 156 is connected to positive bus through the primary winding 157a of a powdered iron core coupling transformer 157. Cathode 156b of tube 156 is supplied with a positive fixed voltage by a pair of voltage dividing resistors 158a and 158b connected between positive and negative bus which renders tube 156 normally non-conductive in the presence of a slightly positive voltage on its screen grid 156d. A capacitor 159 bypasses resistor 158b and provides a shunt path of negligible impedance to alternating current. The control grid 156c of tube 156 is connected through a resistor 160, which limits grid current, to a parallel RLC positive feed back circuit comprising a resistor 161, a capacitor 162 and a feed back winding 157b of coupling transformer 157. A resistor 163 establishes the grid reference voltage at the potential of cathode 156b. Conductor 110 from control relay CR is connected within relay OSC to screen grid 156d of tube 156. Suppressor grid 156e is connected directly to cathode 156b.

The tripping signal of positive unidirectional voltage produced by control relay CR in a manner previously described is supplied by conductor 110 to screen grid 156d, and this signal operably energizes tube 156 which immediately becomes conductive in the absence of a blocking signal from receiver R. Plate current flowing through coupling transformer primary winding 157a induces voltage in feed back winding 157b, and this voltage in a conventional manner causes immediate oscillation in the circuit of tube 156. The components of the feed back circuit are selected to cause oscillations at a high frequency, such as 12,000 cycles per second. As a result, an alternating output voltage is induced in an output winding 157c of coupling transformer 157 substantially instantaneously in response to the tripping signal. Output winding 157c is connected to tripping auxiliary unit TX by means of coaxial cable 154. By using transformer coupling, a desirable direct current isolation between relay OSC and unit TX is achieved. Conductor 155 from receiver R is connected to the positive feed back circuit of auxiliary relay OSC. Whenever a negative voltage blocking signal is produced by receiver R, the average value of control grid voltage of tube 156 is driven to a sufficiently negative value whereby tube 156 is cut off and no conduction can occur even though a tripping signal is applied to screen grid 156d. Thus, relay OSC is able to produce an output voltage to trip circuit breaker 14 only when receiver R is deenergized, and this condition exists only when no carrier-current is being transmitted at the remote terminal of the protected transmission line. It should be apparent that no carrier-current is transmitted from either terminal when a tripping relay Gt or φt at both terminals "see" an internal fault, and this is the only circumstance in response to which tripping is desired.

Tripping auxiliary unit TX operates to energize trip coil 31 of circuit breaker 14 in response to receipt of the alternating output voltage of auxiliary relay OSC. A preferred form of unit TX has been shown in Fig. 2 by way of illustration. Coaxial cable 154, as can be seen in Fig. 2, terminates within unit TX at primary winding 186a of a powdered iron core transformer 186 which is used as an isolating means as well as a voltage transforming means. Transformer secondary winding 186b is connected to a suitable rectifier element 187 wherein a unidirectional voltage is produced in response to the alternating output voltage of auxiliary relay OSC. This unidirectional voltage, which is smoothed by a filter capacitor 188, is of sufficient magnitude to trigger a thyratron element 189. When thyratron 189 fires, it conducts a relatively large tripping current which follows a path from positive bus through the operating coils of two seal-in electromagnetic relays, 190 and 191, through thyratron 189, through an auxiliary switch 192 of circuit breaker 14, and through the trip coil 31 to negative bus. This current energizes the trip coil 31 which actuates latch 32 thereby releasing switch member 33 for rapid circuit interrupting movement. The tripping current also energizes both seal-in relays 190 and 191 which operate in concert to close respective normally open contacts 193 and 194. These contacts are connected in parallel circuit relationship and when closed form a shunt path around thyratron 189 for tripping current flow. Seal-in relay 190 mechanically operates a perceivable indicator or target, not shown, to indicate that the tripping auxiliary unit TX has operated to trip circuit breaker 14. To insure that carrier-current is not transmitted while trip coil 31 is energized, a normally closed contact 208 of seal-in relay 191 is provided between transmitter T and conductor 86 which conveys the starting signal from control relay CR. Upon energization of trip coil 31, relay 191 operates and contact 208 opens to prevent energization of transmitter T which might otherwise momentarily send carrier-current and delay tripping at terminal 15. As switch member 33 of circuit breaker 14 moves to its open circuit position, auxiliary switch 192 operates to interrupt tripping current thereby deenergizing trip coil 31 and seal-in relays 190 and 191. By using a new and improved thyratron circuit especially suitable for the purposes of the illustrated relaying system, which circuit is fully described and claimed in Patent 2,845,582 issued July 29, 1958, to Norman A. Koss, the preferred form of tripping auxiliary unit TX may be made to operably energize trip coil 31 within .0003 second following receipt of output control voltage from auxiliary relay OSC.

Transmitter T and receiver R are employed as means for obtaining intercommunication between opposite terminals of the protected transmission line. Although, for the purpose of illustration, I have shown a relaying system using the well known carrier-current pilot for transmitting signals between terminals, it should be clear that other methods of intercommunication, such as wire pilot or microwave, lend themselves equally well to the system.

The carrier-current transmitter T, shown in block form in Fig. 2, generates a high-frequency continuous signal or carrier-current in response to energization by the starting signal from control relay CR. Suitable amplitude modulating means can be used when telephony is desired. The carrier-current flows to conductor 13 of the protected transmission line through coupling capacitor 23. Conductor 13 provides a path for this current to the remote receiver R coupled to conductor 13 by another capacitor 23 at the remote terminal. Receiver R is tuned to the frequency of the carrier-current transmitted at the opposite terminal and is energized in response to this current to produce a negative voltage blocking signal which is conveyed to auxiliary relay OSC by conductor 155. Because carrier-current is employed to prevent or block tripping, if conductor 13 should fail due to an internal fault involving this conductor, the relaying system would operate correctly to trip both circuit breakers 14 and 15. Receiver R is arranged normally to supply energizing current over conductors 135 and 136 to the supervising electromagnetic relay 134 in control relay CR. But in response to carrier-current, receiver R immediately discontinues this energizing current and consequently supervising relay 134 is deenergized. Where telephony is desired, suitable demodulating means can be used in conjunction with receiver R.

The high frequency oscillation transmitter T and receiver R may be of any suitable construction. For example, the transmitter and receiver circuits disclosed and fully described in United States Letters Patent No. 2,087,127, issued to Sporn and Muller on July 13, 1937, are readily adaptable to perform the transmitting and receiving functions associated with the illustrated embodiment of my invention. By using an arrangement such as this, receiver R will produce its blocking signal within .0008 second following energization of the transmitter T located at the opposite terminal, and this blocking signal will be removed within .001 seconds following deenergization of the transmitter T.

The overall operating time required by the illustrated protective relaying system to energize the trip coils 31 of circuit breakers 14 and 15 following the occurrence of a ground or phase fault on the protected transmission line is less than one cycle on a 60 cycles per second basis under all possible conditions. Within the limits of .002 to .012 second in response to a fault, a starting relay operates, control relay CR issues a starting signal, transmitter T transmits carrier-current, and receiver R responds by producing a blocking signal at auxiliary relay OSC. Within .007 to .016 second following any internal fault, a tripping relay operates, control relay CR responds to stop the starting signal and to energize auxiliary relay OSC, transmitter T is deenergized and receiver R removes its blocking signal from relay OSC, tripping auxiliary unit TX operates, and trip coil 31 is energized. By tests conducted in a 60 cycles per second electric power system I have found that the average overall operating time of the relaying system embodying my invention is ⅝ cycle or approximately .011 second.

While I have shown and described a preferred form of my invention by way of illustration, many modifications will occur to those skilled in the art, I, therefore, contemplate by the appended claims to cover all such modifications as fall within the true spirit and scope of my invention.

What I claim as new and desire to secure by Letters Patents of the United States is:

1. In a fault responsive protective relaying system for an electric power transmission line having spaced apart terminals each including electroresponsively tripped circuit interrupting means for coupling said transmission line in an alternating current electric power system, a signal transmitting and a signal receiving means at each terminal, signal channel means coupling each said transmitting means to all said receiving means, a first fault detecting means at each terminal responsive to ground faults in said electric power system for producing a first control voltage, second fault detecting means at each terminal responsive to phase faults in said electric power system for producing a second control voltage, first directional responsive means at each terminal responsive to a ground fault located in the direction of the protected transmission line for producing a third control voltage, second directional responsive means at each terminal responsive to a phase fault located in the direction of the protected transmission line for producing a fourth control voltage, first control means at each terminal responsive to either said first or second control voltage for substantially instantaneously energizing the associated said signal transmitting means, second control means at each terminal responsive to either said third or fourth control voltage for substantially instantaneously producing both stopping and tripping signal voltages, means supplying said stopping signal voltage to the associated first control means to deenergize the associated signal transmitting means, third control means at each terminal operable in response to said tripping signal voltage substantially instantaneously to initiate tripping operation of the associated circuit interrupting means, said third control means being rendered inoperable by the associated said signal receiving means upon receipt of a signal from a remote transmitting means, blocking means at each terminal for suppressing said tripping signal voltage in delayed response to either said first or said second control voltage, time delay means responsive to either said third or fourth control voltages for disabling said blocking means, said time delay means being rendered inactive by the associated said signal receiving means upon receipt of a signal from a remote transmitting means, and auxiliary means at each terminal coupled to said first control means for supplying thereto a control voltage thereby to energize the associated signal transmitting means.

2. A high speed control relay for producing dependent output control signals in selective response to independent input signals comprising, a first amplifying means responsive to one said input signal for producing a first output control signal, a second amplifying means responsive to another said input signal for producing simultaneously first and second intermediate signals, means supplying said first intermediate signal to said first amplifying means to cut off said first amplifying means thereby discontinuing said first output control signal, and a third amplifying means responsive to said second intermediate signal for producing a second output control signal.

3. In a high speed selective control relay responsive to the reception of separate unidirectional voltage input signals, conversion means responsive to said input signals for converting the unidirectional voltages to an alternating voltage, separate amplifying means each supplied by said alternating voltage and by a different said input signal for deriving separate amplified alternating voltages under the selective supervision of the respective input signals, rectifying means associated with a first said amplifying means for producing a first unidirectional voltage output control signal, separate rectifying means associated with a second said amplifying means for producing first and second unidirectional voltage signals, means supplying said first voltage signal to said first amplifying means to cut off said first amplifying means thereby discontinuing said first output control signal, and impedance changing means responsive to said second voltage signal for deriving a second output control signal.

4. An electric circuit selectively responsive to separate unidirectional voltage input control signals comprising, an electric valve having a cathode, an anode, a control grid and a screen grid, means coupling said anode to said control grid to form an oscillator, means supplying a first input control signal to said screen grid to initiate oscillatory operation of said electric valve, and means supplying a second input control signal to said control grid to suppress the oscillations of said electric valve.

5. A control circuit for operating an electroresponsive device in response to separate energizing and deenergizing input signals of unidirectional voltage comprising, first control means responsive to said energizing input signal for energizing said electroresponsive device, second control means connected to said first control means and operable when energized to disable said first control means thereby deenergizing said electroresponsive device, time delay means for energizing said second control means in delayed response to said deenergizing input signal, and permissive means controlled by said electroresponsive device to prevent energization of said second control means until said electroresponsive device is energized.

6. A control circuit for operating an electroresponsive device in response to separate energizing and deenergizing input signals of unidirectional voltage comprising, first control means for energizing said electroresponsive device in delayed response to said energizing input signal, second control means connected to said first control means and operable when energized to disable said first control means thereby preventing energization of said electroresponsive device, coupling means supplying said deenergizing input signal to said second control means to energize said second control means, and permissive means controlled by said electroresponsive device to prevent energization of said second control means whenever said electroresponsive device is energized.

7. A control circuit for operating an electroresponsive device in response to separate energizing and deenergizing input signals of unidirectional voltage comprising, a first eletcric valve having a cathode, an anode and a control grid, means supplying said energizing input signal to said first valve control grid to initiate conduction by said first valve, means coupling said first valve anode to said electroresponsive device to operably energize said electroresponsive device in response to conduction by said first valve, a second electric valve having a cathode, an anode and a control grid, common resistance means connected to the cathodes of both said first and second valves and responsive to conduction by said second valve to develop on said first valve cathode a sufficient voltage level to suppress conduction by said first valve, and coupling means transmitting said deenergizing input signal to said second valve control grid to initiate conduction by said second valve, said coupling means including permissive means for controlling the transmission of said deenergizing input signal to said second valve control grid in preselected response to operation of said electroresponsive device.

8. In a fault responsive protective relaying system for an electric power transmission line having spaced apart terminals each including electroresponsively tripped circuit interrupting means for coupling said transmission line in an alternating current electric power system, a signal transmitting and a signal receiving means at each terminal, signal channel means coupling each said transmitting means to all said receiving means, a first fault detecting means at each terminal responsive to ground faults in said electric power system for producing a first control voltage, second fault detecting means at each terminal responsive to phase faults in said electric power system for producing a second control voltage, first directional responsive means at each terminal responsive to a ground fault located in the direction of the protected transmission line for producing a third control voltage, second directional responsive means at each terminal responsive to a phase fault located in the direction of the protected transmission line for producing a fourth control voltage, a first amplifying means at each terminal responsive to either said first or second control voltage for producing a starting signal voltage suitable for energizing the associated signal transmitting means, a second amplifying means at each terminal responsive to either said third or fourth control voltage for producing simultaneously a stopping signal voltage and an intermediate signal voltage, means supplying said stopping signal voltage to said first amplifying means to render said first amplifying means inoperable thereby discontinuing said starting signal voltage and deenergizing the associated signal transmitting means, third amplifying means at each terminal responsive to said intermediate signal voltage for producing a tripping signal voltage, control means at each terminal responsive to said tripping signal voltage for initiating tripping operation of the associated circuit interrupting means unless a signal is being received by the associated signal receiving means, and transient blocking means at each terminal for suppressing said tripping signal voltage in delayed response to either said first or second control voltage and for reestablishing said tripping signal voltage under control by the associated signal receiving means in delayed response to either said third or fourth control voltage.

9. In a fault responsive protective relaying system for an electric power transmission line having spaced apart terminals each including electroresponsively tripped circuit interrupting means for coupling said transmission line in an alternating current electric power system, a signal transmitting and a signal receiving means at each terminal, signal channel means coupling each said transmitting means to all said receiving means, a first fault detecting means at each terminal responsive to ground faults in said electric power system for producing a first control voltage, second fault detecting means at each terminal responsive to phase faults in said electric power system for producing a second control voltage, first directional responsive means at each terminal responsive to a ground fault located in the direction of the protected transmission line for producing a third control voltage, second directional responsive means at each terminal responsive to a phase fault located in the direction of the protected transmission line for producing a fourth control voltage, first control means at each terminal for energizing the associated signal transmitting means in response to either one of said first and second control voltages and for producing a tripping signal voltage while deenergizing said signal transmitting means in response to either one of said third and fourth control voltages, second control means at each terminal responsive to said tripping signal voltage for initiating tripping operation of the associated circuit interrupting means unless a signal is being received by the associated signal receiving means, blocking means at each terminal for suppressing said tripping signal voltage in delayed response to either one of said first and second control voltages, and time delay means at each terminal responsive to either one of said third and fourth control voltages for disabling said blocking means and reestablishing said tripping signal voltages, said time delay means being rendered inoperable by the associated signal receiving means as long as a signal is being received.

10. In a fault responsive protective relaying system for an electric power transmission line having spaced apart terminals each including electroresponsively tripped circuit interrupting means for coupling said transmission line in an alternating current electric power system, a signal transmitting and a signal receiving means at each terminal, signal channel means coupling each said transmitting means to all said receiving means, a first fault detecting means at each terminal responsive to ground faults in said electric power system for producing a first control voltage, second fault detecting means at each terminal responsive to phase faults in said electric power system for producing a second control voltage, first directional responsive means at each terminal responsive to a ground fault located in the direction of the protected transmission line for producing a third control voltage, second directional responsive means at each terminal responsive to a phase fault located in the direction of the protected transmission line for producing a fourth control voltage, first control means at each terminal for energizing the associated signal transmitting means in response to either one of said first and second control voltages and for producing a tripping signal voltage while deenergizing said signal transmitting means in response to either one of said third and fourth control voltages, an electric valve at each terminal having a cathode, an anode, a control grid and a screen grid, means coupling said anode to said control grid to form an oscillator at each terminal, means supplying said tripping signal voltage to said screen grid to initiate oscillatory operation of said electric valve, means coupled to the associated signal receiving means to supply a unidirectional voltage to said control grid to supress the oscillations of said electric valve upon receipt by said signal receiving means of a signal from a remote transmitting means, and transient blocking means at each terminal for suppressing said tripping signal voltage in delayed response to either one of said first and second control voltages and for reestablishing said tripping signal voltage under control of the associated signal receiving means in delayed response to either one of said third and fourth control voltages.

11. A control circuit for operating an electroresponsive device in response to separate energizing and deenergizing input signals comprising, first control means responsive to said energizing input signal to operably energize said electroresponsive device, second control means connected to said first control means and operable when energized to disable said first control means thereby deenergizing said electroresponsive device, supervising means supplied by said deenergizing input signal, and circuit means interconnecting said supervising means and said second control means for transmitting with time delay said deenergizing input signal thereby to energize said second control means, said circuit means including permissive means for controlling energization of said second control means in preselected response to operation of said electroresponsive device.

12. A high speed control relay for producing dependent output control signals in selective response to first and second independent input signals comprising, first amplifying means responsive to said first input signal for producing a first output control signal, second amplifying means responsive to said second input signal for producing simultaneously first and second intermediate signals, means supplying said first intermediate signal to said first amplifying means to disable said first amplifying means thereby discontinuing said first output signal, third amplifying means responsive to said second intermediate signal for producing a second output control signal, an electroresponsive device connected to said third amplifying means and operable with a predetermined time delay when energized to suppress said second output signal, first control means responsive to said first input signal for energizing said electroresponsive device, second control means connected to said first control means and operable with a predetermined time delay when energized to disable said first control means thereby deenergizing said electroresponsive device, and circuit means including permissive means controlled by said electroresponsive device to supply said second input signal to said second control means for energizing said second control means only after said electroresponsive device has operated.

13. A high speed selective control relay responsive to five independent unidirectional voltage input signals comprising, first means responsive to any one of first, second and third unidirectional voltage input signals for producing a first amplified output control signal, second means responsive to either fourth or fifth unidirectional voltage input signals for producing simultaneously first and second continuous intermediate signals, circuit means connected between said first and second means for supplying said first intermediate signal to said first means to disable said first means and thereby discontinue said first output signal, and third means connected to said second means and responsive to said second intermediate signal for producing a second amplified output control signal.

14. In a high speed selective control relay responsive to the reception of separate unidirectional voltage input signals, conversion means including an oscillator supplied by said input signals for converting the unidirectional voltages to a basic alternating voltage, first amplifying means supplied by said basic alternating voltage and by one of said input signals for deriving a first amplified alternating voltage dependent upon the existence of said one input signal, second amplifying means connected to said first amplifying means for further amplifying said first amplified alternating voltage, first rectifying means connected to said second amplifying means for rectifying the finally amplified alternating voltage and producing a first unidirectional voltage output control signal, third amplifying means supplied by said basic alternating voltage and by another one of said input signals for deriving a second amplified alternating voltage dependent upon the existence of said other input signal, a plurality of rectifier and voltage doubler means connected to said third amplifying means and responsive to said second amplified alternating voltage for producing first, second and third unidirectional voltage intermediate signals, circuit means supplying said first and second intermediate signals to said first and second amplifying means, respectively, to disable said first and second amplifying means and thereby discontinue said first output control signal, and impedance changing means responsive to said third intermediate signal for deriving a second unidirectional voltage output control signal.

15. A high speed control relay for producing dependent output control signals in selective response to independent input signals comprising, first control means effective in response to one of the input signals to produce a first output control signal, second control means responsive to another input signal for substantially simultaneously producing a second output control signal and an intermediate signal, and means supplying said intermediate signal to said first control means to render said first control means ineffective to produce said first output control signal.

16. In combination, an electroresponsive device operable with a predetermined time delay when energized to perform a preselected control function and a control circuit for energizing and deenergizing said electroresponsive device in preselected response to separate energizing and deenergizing input signals, said control circuit comprising first control means responsive to said energizing input signal for energizing said electroresponsive device, second control means connected to said first control means and operable a predetermined interval of time after energization to disable said first control means thereby deenergizing said electroresponsive device, circuit means connected to said second control means for conveying said deenergizing input signal to said second control means for energizing said second control means, and permissive means connected in said circuit means and controlled by said electroresponsive device to render said circuit means ineffective to convey said deenergizing input signal to said second control means until after said electroresponsive device has operated.

17. A circuit for performing a predetermined control function in preselected response to separate energizing and deenergizing input voltage signals comprising, first means operable in delayed response to said energizing input signal to perform the predetermined control function, second means connected to said first means and operable with a predetermined time delay in response to said deenergizing input signal to disable said first means thereby discontinuing the performance of said predetermined control function, and independently controlled supervising means associated with said second means to render said second means inactive.

18. A circuit for performing a predetermined control function in preselected response to separate energizing and deenergizing input signals, comprising, first means responsive to said energizing input signal to perform the predetermined control function, second means connected to said first means and operable when energized to disable said first means, and coupling means supplying said deenergizing input signal to said second means to energize said second means, said coupling means including permissive means effective in preselected response to the performance of said predetermined control function to control the energization of said second means by said deenergizing input signal.

References Cited in the file of this patent

UNITED STATES PATENTS

| | | |
|---|---|---|
| 1,294,326 | Bethenod | Feb. 11, 1919 |
| 1,356,763 | Hartley | Oct. 26, 1920 |
| 2,380,805 | Traver | July 31, 1945 |
| 2,504,828 | Goldsborough | Apr. 18, 1950 |
| 2,548,612 | McConnell | Apr. 10, 1951 |
| 2,561,848 | Devey | July 24, 1951 |
| 2,676,286 | Buchner | Apr. 20, 1954 |
| 2,692,963 | Hathaway | Oct. 26, 1954 |